(12) United States Patent
Scherzinger

(10) Patent No.: US 8,600,659 B1
(45) Date of Patent: Dec. 3, 2013

(54) METHOD AND SYSTEM FOR GEOGRAPHIC SEARCH FOR PUBLIC TRANSPORTATION COMMUTERS

(75) Inventor: Steffi Scherzinger, Munich (DE)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 13/195,763

(22) Filed: Aug. 1, 2011

(51) Int. Cl.
*G01C 21/00* (2006.01)

(52) U.S. Cl.
USPC ............. 701/400; 701/25; 701/414; 701/426; 701/450

(58) Field of Classification Search
USPC ........... 701/25, 400, 411, 412, 414, 420, 522, 701/532, 410, 426, 428, 438, 450
See application file for complete search history.

(56) References Cited

U.S. PATENT DOCUMENTS

| | | | |
|---|---|---|---|
| 6,954,697 B1 | 10/2005 | Smith | |
| 7,054,743 B1 | 5/2006 | Smith | |
| 7,136,744 B2 * | 11/2006 | Maeda | 701/411 |
| 7,155,339 B2 | 12/2006 | Tu | |
| 7,613,331 B2 * | 11/2009 | Maeda | 382/113 |
| 7,698,062 B1 | 4/2010 | McMullen et al. | |
| 2006/0089788 A1 | 4/2006 | Laverty | |
| 2006/0212218 A1 | 9/2006 | Smith | |
| 2006/0253247 A1 | 11/2006 | de Silva et al. | |
| 2007/0219706 A1 | 9/2007 | Sheynblat | |
| 2010/0185385 A1 | 7/2010 | Philbin et al. | |

* cited by examiner

*Primary Examiner* — Gertrude Arthur Jeanglaude
(74) *Attorney, Agent, or Firm* — McDermott Will & Emery LLP

(57) ABSTRACT

Systems, methods, and machine-readable media for identifying points of interest are provided. The system may include an interface module, a route module, a search module, and a rank module. The interface module may be configured to receive a request to identify points of interest along a travel route, the request including a predetermined distance and a search term. The route module may be configured to obtain, from a database, a set of travel decision nodes along the travel route. The search module may be configured to perform, for each travel decision node in the set of travel decision nodes, a search for points of interest within the predetermined distance of the travel decision node based on the search term. The rank module may be configured to prioritize the points of interest identified by the search. After the points of interest are prioritized, the interface module may output the prioritized points of interest.

15 Claims, 6 Drawing Sheets

200

400

500

METHOD AND SYSTEM FOR GEOGRAPHIC SEARCH FOR PUBLIC TRANSPORTATION COMMUTERS

BACKGROUND

The present disclosure generally relates to location based services and, in particular, to identifying points of interest.

Location based services are often used to identify points of interest near a location. For example a user may search for a point of interest (e.g., a restaurant, gym, or market) near a particular location (e.g., the user's current location). Location based services may also be used to determine a route from a starting location to a destination. However, it may be more convenient for a user to be shown points of interest that are along a route to a destination (e.g., a commute route between work and home) so that a user may go to the points of interest on the way to or from the destination.

SUMMARY

According to one aspect of the subject technology, a system for identifying points of interest is provided. The system may include an interface module, a route module, a search module, and a rank module. The interface module may be configured to receive a request to identify points of interest along a route, the request including a predetermined distance and a search term. The route module may be configured to obtain, from a database, a set of nodes along the route. The search module may be configured to perform, for each node in the set of nodes, a search for points of interest within the predetermined distance of the node based on the search term. The rank module may be configured to prioritize the points of interest identified by the search. After the points of interest are prioritized, the interface module may output the prioritized points of interest.

According to another aspect of the subject technology, a method for identifying points of interest is provided. The method may include receiving a request to identify points of interest along a route, the request including a set of search parameters. A set of travel decision nodes along the route may be identified and a search may be performed to identify points of interest based on the set of search parameters, each of the points of interest within a predetermined distance of a travel decision node in the set of travel decision nodes. The points of interest identified by the search may be outputted.

According to yet another aspect of the subject technology, a machine-readable medium including instructions stored therein, which when executed by a machine, cause the machine to perform operations for identifying points of interest is provided. The operations may include receiving a route indication and a set of search parameters, generating a route based on the route indication, identifying a set of nodes along the route, and, for each node in the set of nodes, identifying points of interest that conform to the set of search parameters and are near the node.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for identifying points of interest along a route are disclosed. Being able to identify points of interest along a route allows users to find and choose a point of interest to go to while on the way to a destination. For example, a user may easily identify a dry cleaner that is convenient to stop at on the way to work, a gym or market that is convenient to stop at on the way home, a restaurant to stop and eat at that is on the way to a destination, etc. This may be especially helpful for users who take public transportation (e.g., trains, subways, buses, etc.) and would like to identify points of interest at one or more stops along their route. The identified points of interest along a route may also be ranked and displayed to a user such that the user may be able to quickly determine the closest or most convenient point of interest to go to.

Figure 1:
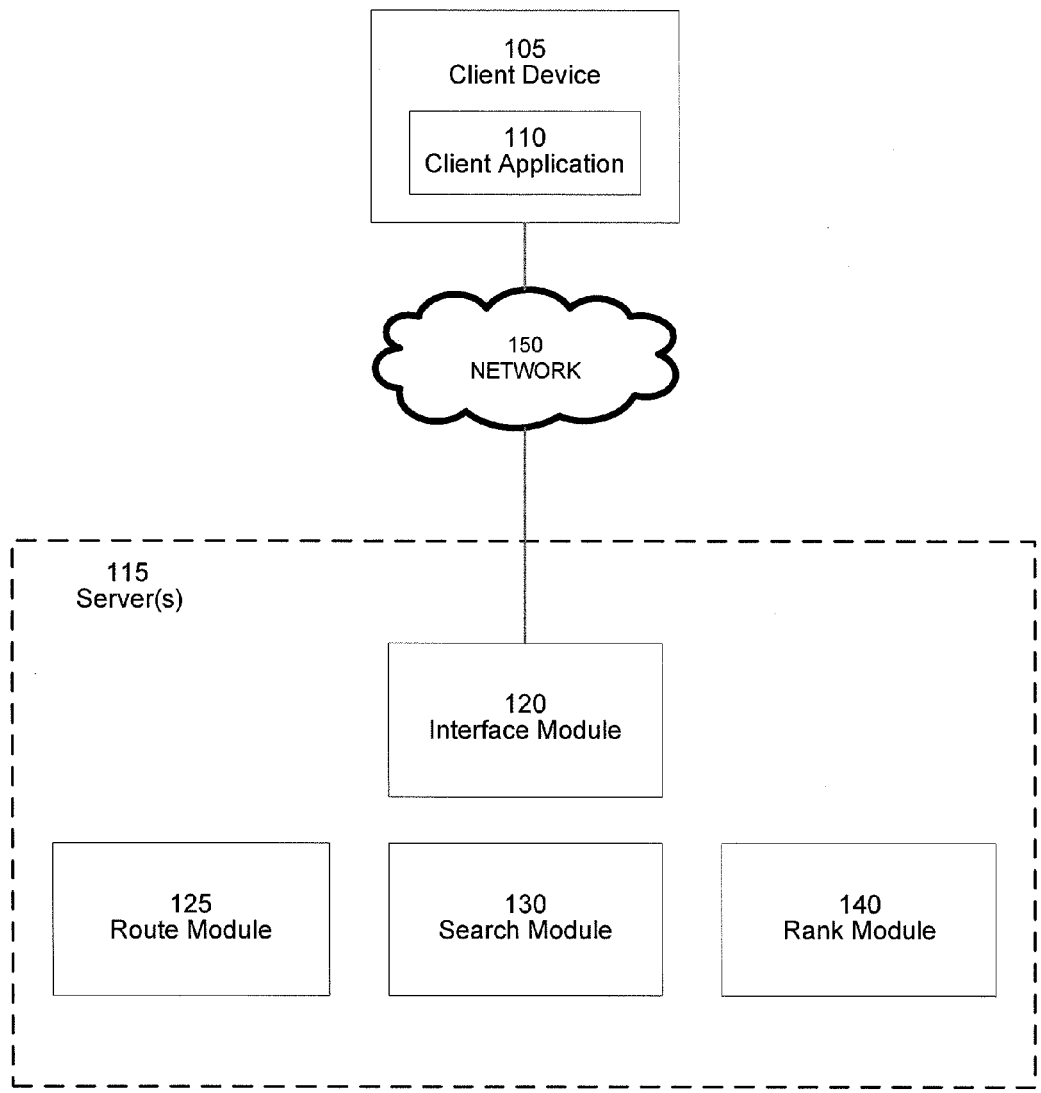
FIG. 1 is a conceptual block diagram illustrating a network environment for identifying points of interest along a route, in accordance with various aspects of the subject technology.

FIG. 1 is a conceptual block diagram illustrating a network environment 100 for identifying points of interest along a route, in accordance with various aspects of the subject technology. Although FIG. 1 illustrates a client-server network environment 200, other aspects of the subject technology may include other configurations including, for example, peer-to-peer environments or single system environments. The network environment 100 may include at least one server 115 and at least one client device 105 connected over a network 150.

The client device 105 may be any machine able to transmit a search request for points of interest along a route to the server 115. For example, client device 105 may be a computer, a laptop, a mobile device (e.g., a phone, tablet, personal digital assistant (PDA), a global positioning system (GPS) device, etc.), or any other machine with a processor, memory, and communications capabilities.

The client device 105 may also include one or more client applications 110 that may be configured to make a search request for points of interest along a route, receive search results for the request, and display the search results to a user. Some example client applications 110 may include, but are not limited to, a mapping application, local search application, or a browser. A user interface of the client application 110 may be used by a user to input route parameters by, for example, inputting a starting point and a destination or by selecting a predefined route. The user may also input one or more search parameters into the user interface and transmit a search request for points of interest along the route that match those search parameters to the server 115 via the network 150.

The network 150 can include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The server 115 may be any system or device having a processor, a memory, and communications capability that may be used to identify points of interest along a route. The server 115 may be a virtual entity that might refer to a cluster or even multiple clusters of servers. In one aspect, the server 115 may include an interface module 120, a route module 125, a search module 130, and a rank module 140. The modules illustrated in FIG. 1 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 120 may be configured to communicate with other systems (e.g., client devices), servers, and other modules. For example, the interface module may receive a search request for points of interest along a route from a client device 105. The search request may include route parameters and search parameters that may be used to identify points of interest for the user. Route parameters may include a starting point and an ending point or a predefined route such as a saved route, favorite route, or frequently used route. The search parameters may include one or more search strings, a category of point of interest (e.g., restaurant, market, park, etc.), a desired distance range from the route in which to search (e.g., within 1 mile, within a 15 minute walking distance, etc.), a mode of transportation (e.g., walking, driving, bus, train, any public transportation means, etc.), or any other parameter that may be associated with a point of interest (e.g., low prices, special deals, online reviews, etc.).

The route module 125 may be configured to identify a route based on the route parameters and obtain a set of nodes along the route that will be used to find points of interest along the route. In the case where a user selects a predefined route, the route module 125 may simply find nodes along the selected route. However, if the routing parameters include a starting point and an ending point instead, the route module 125 may generate one or more routes from the starting point to the ending point based on existing mapping data from a mapping database. In some cases the route module 125 may also need to factor in one or more search parameters in generating the route. For example, if a user selects a particular mode of transportation such as public transportation, the route module 125 may need to generate a route from the starting point to the ending point using public transportation pathways in the mapping data (e.g., bus lines, rail lines, etc.). Once the route is generated, the route module 125 may identify nodes along the generated route.

The route module 125 may identify nodes along the route in various ways. The nodes may be, for example, a random selection of points along the route, uniformly spaced points along the route, notable points along the route (e.g., freeway exits or interchanges, intersections, landmarks, decision points along the route, etc.), or other points along the route. The nodes may be generated by the routing module 125 or predetermined and retrieved from a database. For example, if the route is a public transportation route, the nodes may be public transportation stops (e.g., bus stops, train stations, subway or light rail stops, etc.) that are obtained from a public transportation network database that may include information on public transportation paths, the stops on those paths, and the schedule for the public transportation routes.

The search module 130 may then perform a search for points of interest near the nodes along the route based on the search parameters. As mentioned above, the search parameters may include search strings, a category of point of interest, a desired distance range from the route in which to search, a mode of transportation, or any other parameter that may be associated with a point of interest. For example, the search parameters may include the search string "gym" and a 15 minute walking distance. Based on the search parameters, the search module may search areas that are within 15 minute walking distance a node along the route for points of interest associated with the search term "gym." Each of the search results that are generated may include a target (e.g., a desired point of interest), the node from which the target was found, and the distance between the target and the node.

The points of interest in the search results generated by the search module 130 may then be ranked by the rank module 140. The points of interest may be ranked based on, for example, the distance between each point of interest and the node from which the point of interest was found. A point of interest may also be ranked based on the distance from the point of interest to the route starting point or the route destination.

In another aspect of the subject technology, a point of interest in the search results may also be ranked based on whether the node from which the point of interest was found is a transition point in a route. A transition point in the route may be any location where the route calls for a transition from one mode of transportation to another (e.g., from a bus line to a subway line) or a transition within the same mode of transportation (e.g., from one subway line to another subway line). If the route is a public transportation route (e.g., a combination of one or more of a bus route, subway route, etc.), the points of interest in the search results may also be ranked based on the frequency of service of the public transportation at the node from which the point of interest was found.

Figure 2:
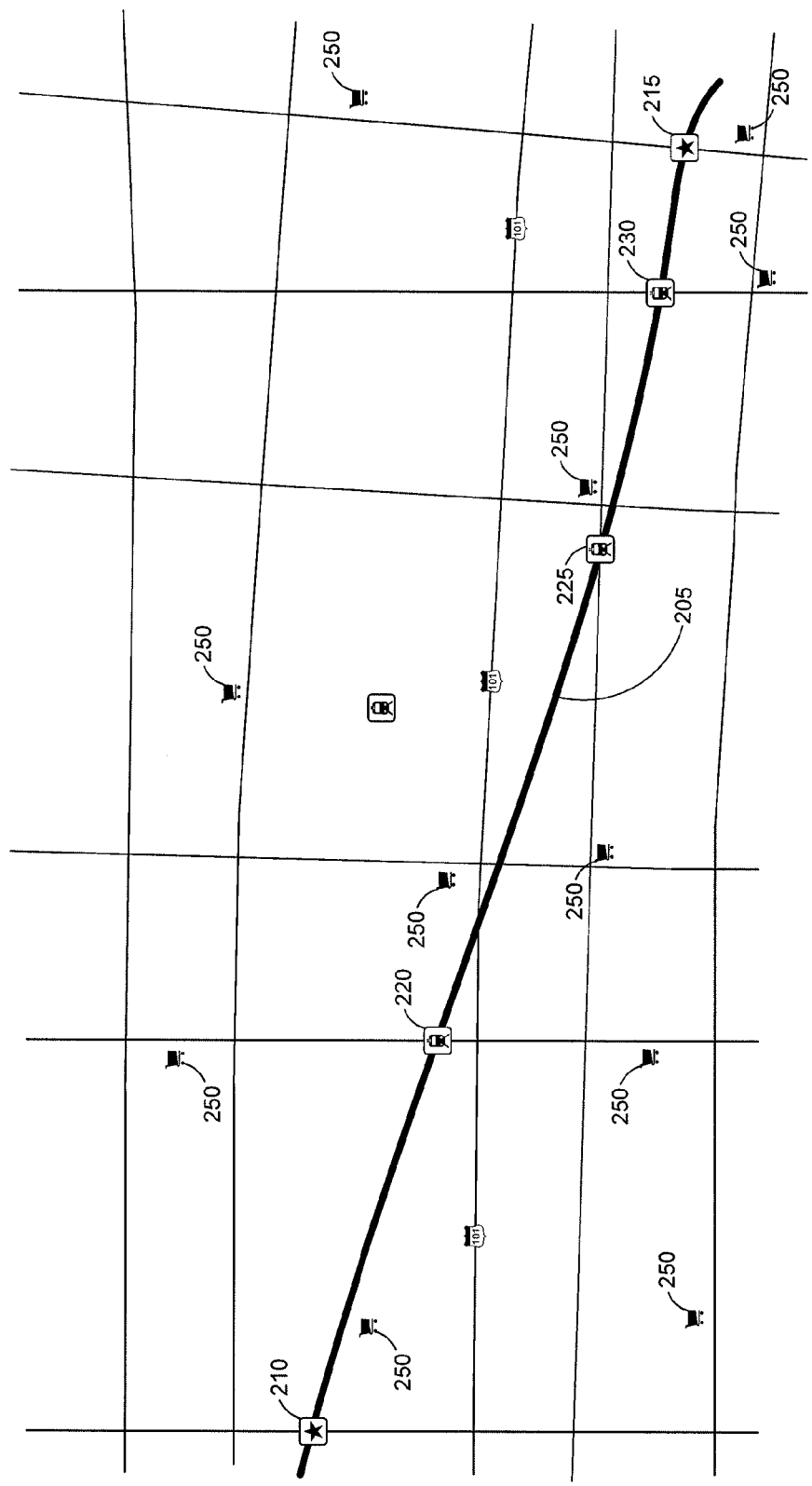
FIG. 2 is a conceptual representation of a route, in accordance with one aspect of the subject technology.

Once the points of interest in the search results are ranked, the search results may be transmitted to the client device 105 by the interface module 210. FIG. 2 may help to illustrate an example of nodes and points of interest along a route.

FIG. 2 is a conceptual representation 200 of a route 205, in accordance with one aspect of the subject technology. The route module 125 may obtain a set of nodes along the route, which may include the starting point 210 and the ending point 215. For example, where the route 205 is along a subway line, the route module 125 may query a public transportation network database for subway stops 220, 225, and 230 along the route 205. The subway stops 220, 225, and 230 may be used by the route module 125 as nodes along the route 205. After the nodes are determined, the search module 130 may search for points of interest in the vicinity of each of the nodes based on the search parameters. For example, the search module 130 may search for markets 250 within a 15 minute walking distance of the route 205 and generate search results that may be ranked by the rank module 140 and transmitted to the client device 105 for display to a user.

Figure 3:
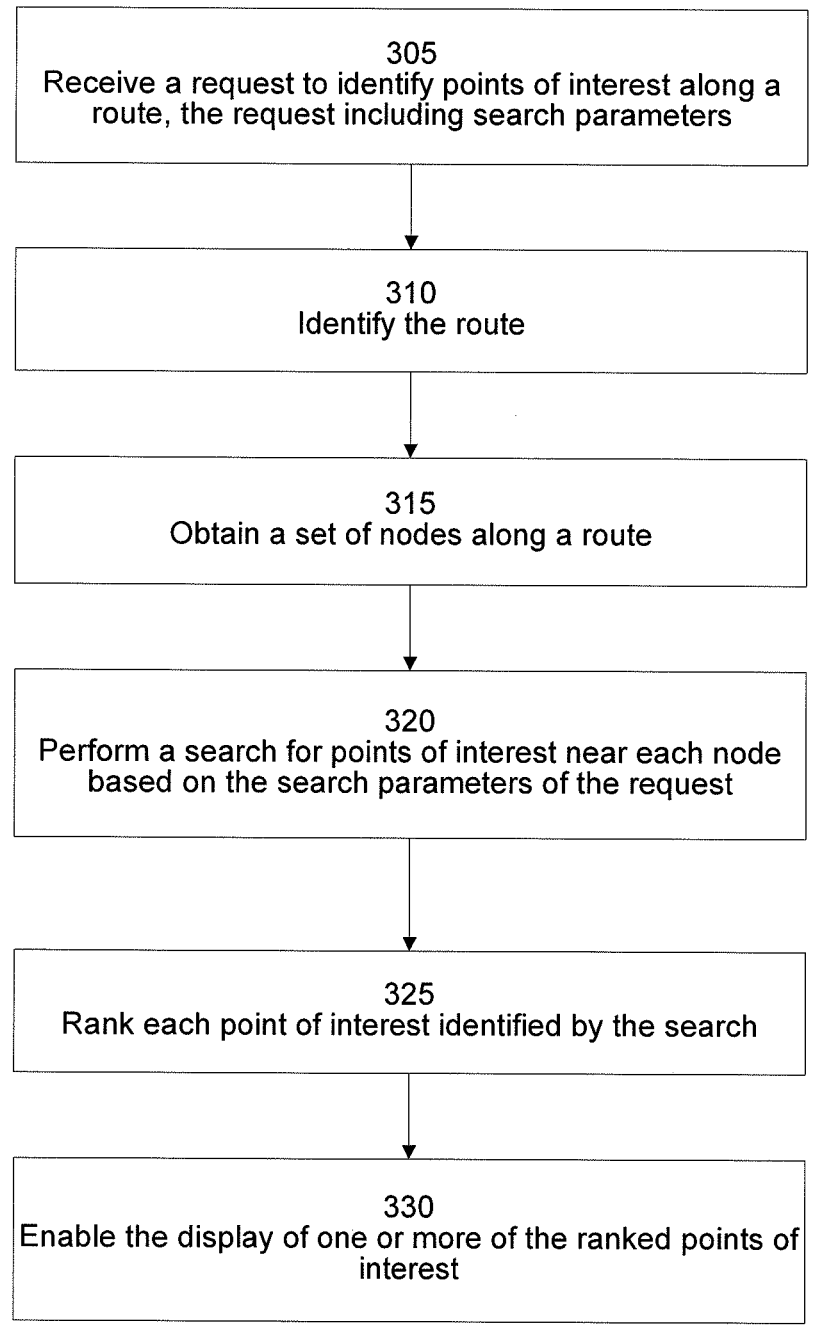
FIG. 3 is a flow chart illustrating a process for identifying points of interest along a route, in accordance with various aspects of the subject technology.

FIG. 3 is a flow chart illustrating a process 300 for identifying points of interest along a route, in accordance with various aspects of the subject technology. Although the operations in process 300 are shown in a particular order, certain operations may be performed in different orders or at the same time. The process 300 may begin at operation 305, where the interface module 120 may receive a request to identify points of interest along a route from a client device 105. The request may include route parameters that may be used to identify the route on which to base a search for points of interest and search parameters that may be used to perform the search.

At operation 310, the route module 125 may identify a route on which to base the search for points of interest. The route 205 may be selected by the user or generated by the route module 125 based on a starting point 210 and an ending point 215. For example, the route module 125 may obtain mapping information from a mapping database that includes information on a network of navigable pathways that may be used to travel from one location to another. In some cases, the network of navigable pathways may be represented as a graph of nodes and edges, with different weights associated with each edge. The weights may represent a distance, a travel time, or some other cost. The route module 125 may use a path finding algorithm (e.g., the Dijkstra's algorithm or A* algorithm) to find an optimal route (e.g., the shortest route, the fastest route, the lowest cost route, the route with the least number of transitions, etc.) on the network of navigable pathways from the starting point 210 to the ending point 215.

In another aspect, the interface module 120 may receive a series of GPS signals from a mobile device of the user. Based on the location coordinates of the GPS signals, the route module 125 may identify paths frequently traveled by the user and generate a route for the user based on the frequently traveled paths.

Once the route is identified, the route module 125 may obtain a set of nodes along the route at operation 315. The nodes may be a set of points along the route that are selected by the route module 125 for any number of reasons. A database containing predefined nodes may also be queried in order to obtain the set of nodes along the route. For example, if the route is a public transportation route, the nodes may be public transportation stops (e.g., bus stops, train stations, subway or light rail stops, etc.) that are obtained from a public transportation network database.

At operation 320, the search module 130 may perform a search for points of interest near each node based on the search parameters associated with the request. For example the search module 130 may search for all gyms within a mile of one of the nodes along the route or any markets within a 15 minute walking distance of one of the nodes along the route. As will be further illustrated by FIG. 4, a walking distance for a given time may be the distance along a walkable path in the mapping data that is able to be traveled by walking in a certain period of time.

Figure 4:
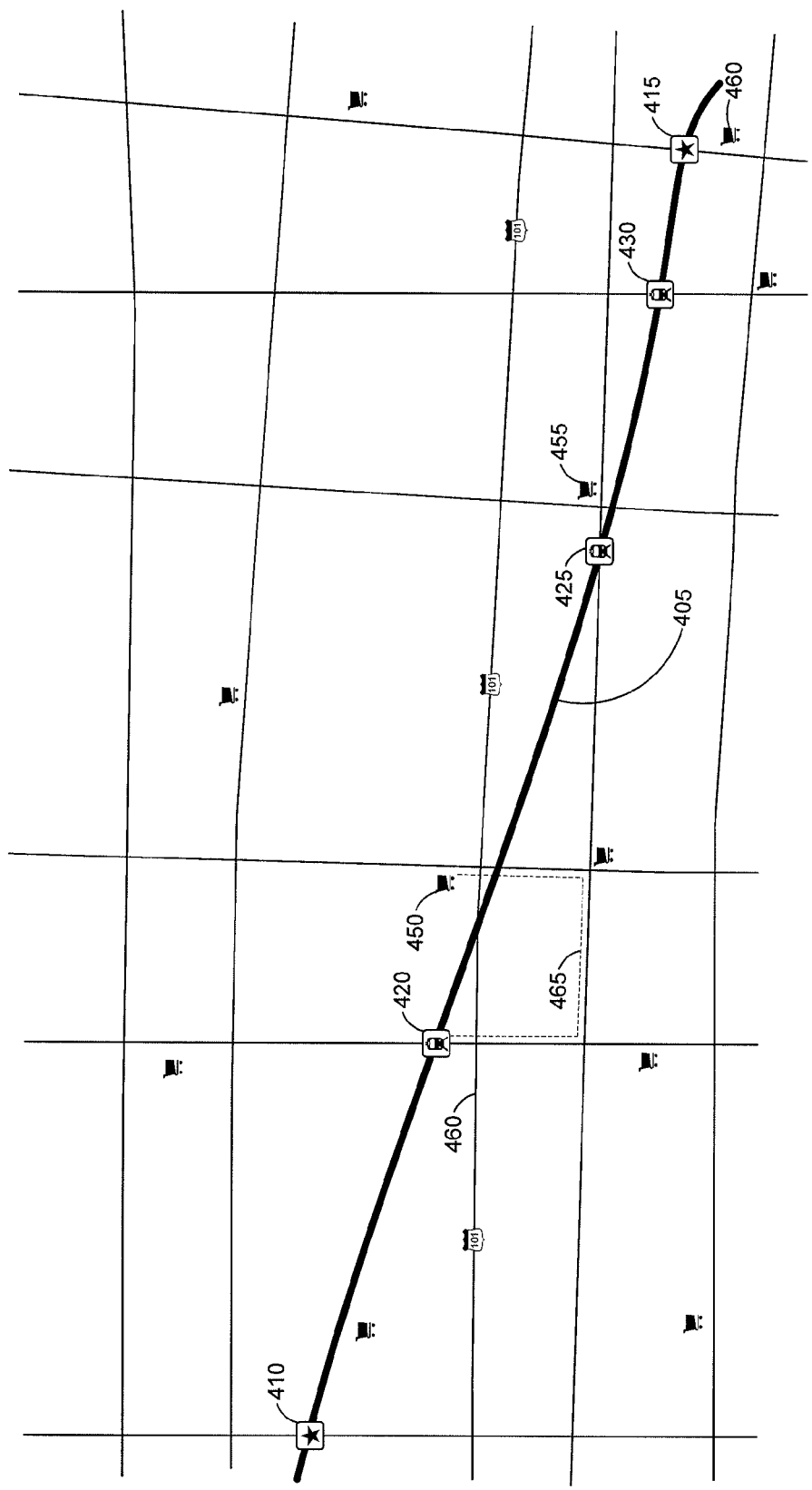
FIG. 4 is a conceptual representation of a route, in accordance with one aspect of the subject technology.

FIG. 4 is a conceptual representation 400 of a route 405, in accordance with one aspect of the subject technology. The route 405 may have nodes that include the starting point 410, the ending point 415, and subway stops 420, 425, and 430 along the route 405. Market 450 may have been found by searching for points of interest near subway stop 420, market 455 may have been found by searching for points of interest near subway stop 425, and market 460 may have been found by searching for points of interest near ending point 415.

In FIG. 4, the walking distance from a node, subway stop 420, and market 450 may be the shortest distance on a walkable path between the two locations. In FIG. 4, this is represented by the walkable route 465. Although the mapping data may include highway 460, highway 460 is not included in the walkable route 465 because highway 460 does not allow pedestrian access. The walking distance represented by walkable route 465 may be in the form of a distance (e.g., subway stop 420 is 1 kilometer away from the market 450) or a time (e.g., it would take 13 minutes to walk from the subway stop 420 to the market 450, in other words, the subway stop 420 is a 13 minute walking distance away from the market 450).

Referring back to FIG. 3, after the search based on the search parameters returns search results that include one or more points of interest, the rank module 140 may rank the points of interest at operation 325. The points of interest in the search results may be ranked based on any characteristic or combination of characteristics associated with each point of interest. How the points of interest are ranked may also be based on preferences or settings selected by a user.

According to some aspects, the rank module 140 may rank the points of interest by calculating a score for each point of interest. The scores may be based on a formula that assigns various weights to various factors or signals. One example formula may be in the format provided below:

$$\text{Score} = (w1 \cdot f1) + (w2 \cdot f2) + (w3 \cdot f3) \ldots$$

where f1, f2, and f3 are factors (e.g., distance from the point of interest to a node, distance from the point of interest to a route transition point, the degree the point of interest matches the search parameters, point of interest ratings, etc.) and w1, w2, and w3 are weights assigned to the factors. The relative rank of each point of interest may be based on the score for each point of interest.

As mentioned above, one of the factors that may be used to rank points of interest is the distance from each point of interest to the node from which the point of interest was found or a distance from each point of interest to the starting point or ending point of the route. For example, in FIG. 4, the market 450 may be ranked higher than the market 455 because market 455 is closer to the node from which the market 455 was found (e.g., subway stop 425) than market 450 is from the node from which the market 450 was found (e.g., subway stop 420). On the other hand, market 460 may be ranked higher than market 455 even if they are similar distances from the nodes from which each was found because market 460 is closer to an ending point than market 455. Points of interest near the starting point and ending point of a route may be prioritized over other points of interest in some cases because it may be more convenient for users to stop by a point of interest at the beginning or end of a route.

Figure 5:
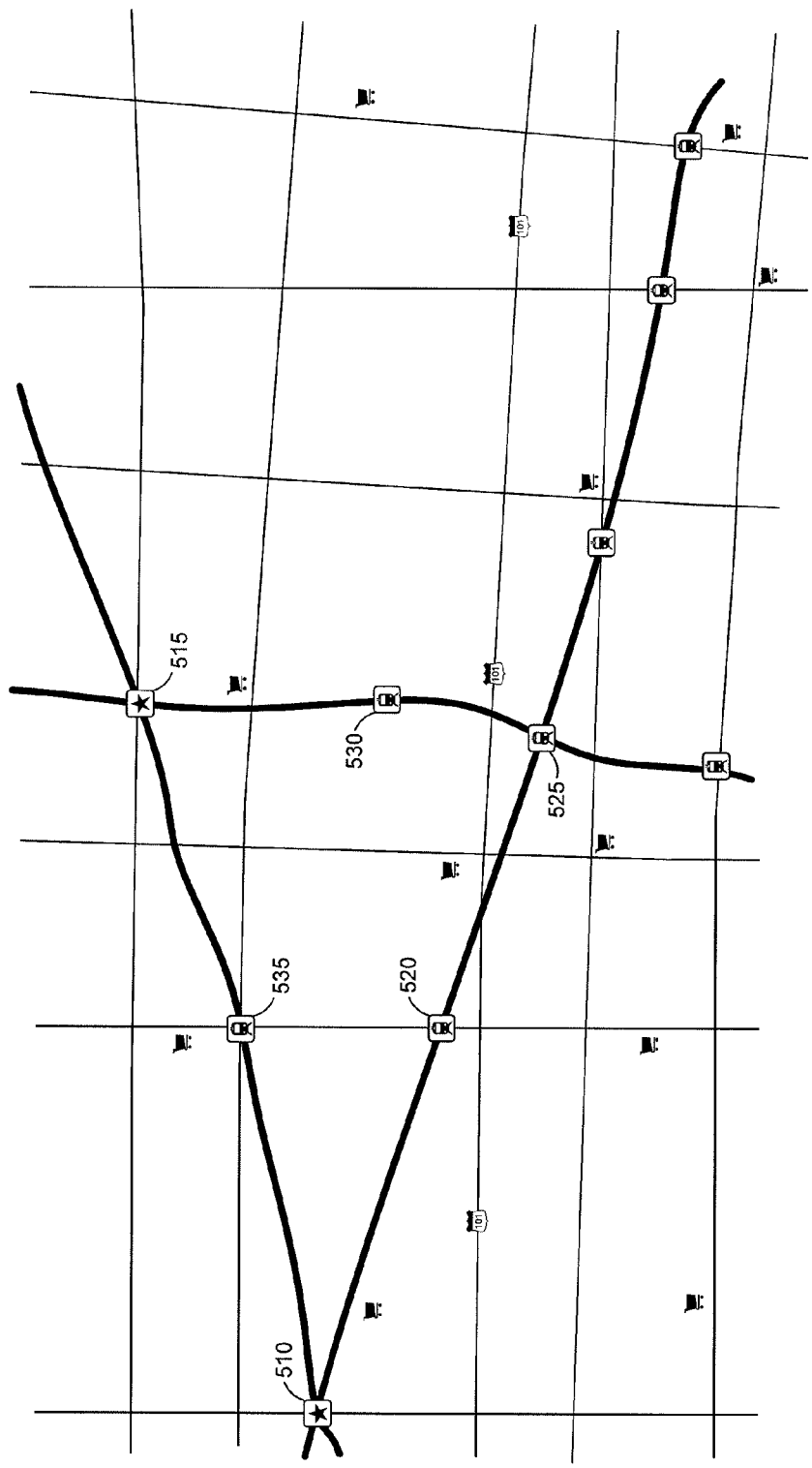
FIG. 5 is a conceptual representation of a route from a starting point to an ending point, in accordance with one aspect of the subject technology.

In another aspect, a point of interest in the search results may also be ranked based on whether the node from which the point of interest was found is a route transition point. As discussed above, a route transition point may be a point in the route where a user changes modes of transportation (e.g., from car to train) or changes paths within the same mode of transportation (e.g., from one subway line to another subway line). Points of interest near nodes that are route transition points may be favored over other nodes in some cases because it may be more convenient for a user to stop at a point of interest at the transition point, where the user must transition anyway, rather than having to make a stop at another point in the route. FIG. 5 may help to illustrate.

FIG. 5 is a conceptual representation 400 of a route from a starting point 510 to an ending point 515, in accordance with one aspect of the subject technology. One route may begin with starting point 510, go through subway stops 520, 525, 530, and end at ending point 515. In this route, subway stop 525 may be a route transition point because a user must change from one subway line to another at subway stop 525. As a result, points of interest found by searching for points of interest near subway stop 525 may be preferred over other points of interest found from searching other nodes in the route.

If the route or a portion of the route includes nodes that are part of a public transportation network, a point of interest in the search results may also be ranked based on the schedule of service of the node from which the point of interest was found. For example, points of interest near nodes with frequent service may be preferred over other points of interest near nodes with less frequent service because, in some cases, it may be more convenient for a user to stop at a point of interest if the public transportation stop has frequent service. Service schedules and frequency may be obtained, for example, by querying the public transportation network database. FIG. 5 may help to illustrate ranking points of interest based on frequency of service for a node.

In FIG. 5, one route begins with starting point 510, goes through subway stops 520, 525, 530, and end at ending point 515. Another route begins with starting point 510, goes through subway stop 535, and ends at ending point 515. If subway stop 535 has a scheduled subway car stop, on average, once every 5 minutes and subway stop 520 has a subway car stop, on average, once every 10 minutes, it may be more convenient for a user to stop by a point of interest near subway stop 535. As a result, points of interest found near subway stop 535 may be favored over points of interest near subway stop 520.

Referring back to FIG. 3, after the points of interest in the search results are ranked, at operation 330, the search results may be formalized and transmitted to a client application 110 to be displayed to a user. In one aspect a search result interface that includes the ranked points of interest (e.g., a ranked list of points of interest or a map interface showing the points of interest) may be generated and transmitted to the client application 110 to be displayed to the user.

In some aspects, global positioning system (GPS) signals, coordinates, and devices may be used. However, one or more other technologies can be used in addition to or instead of GPS to determine location coordinates representing a geographic location. Thus, it should be understood that location coordinates may be analyzed as discussed herein to identify frequently traveled paths based on mapping data stored in a database and identify points of interest regardless of the technology or technologies used to determine the location coordinates.

Regardless of how location data is obtained, appropriate efforts may also be taken to protect user privacy rights. For example, collection of location data may be on an opt-in basis so that data is not collected unless the user has granted permission, with the location data stored and handled in a secure manner. Additionally, steps can be taken to anonymize the location data (e.g., to ensure that the location data cannot be tied to a particular user and/or to a particular device).

Figure 6:
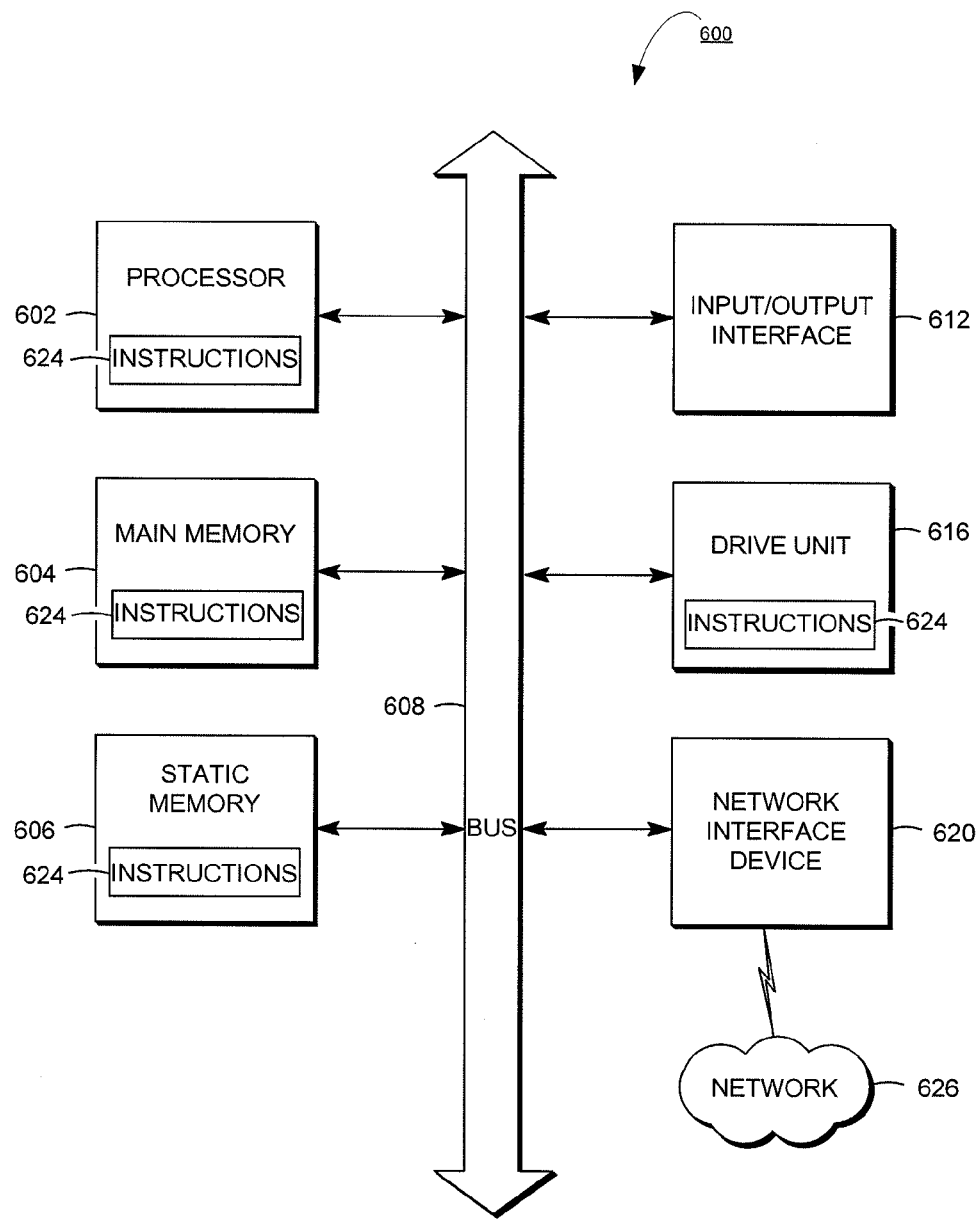
FIG. 6 is a block diagram illustrating a computer system with which any of the clients and servers of FIG. 1 may be implemented.

FIG. 6 is a block diagram illustrating a computer system with which any of the clients and servers of FIG. 1 may be implemented. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for identifying points of interest along a route are described. According to various aspects of the subject technology, a system may be configured to receive a request to search for points of interest along a route that includes search parameters. A route may be identified and used to determine a set of nodes along the route. Once determined, the system may perform a search for points of interest near each node along the route based on the search parameters. The results from the search may be ranked based on various factors and provided to a client application to be displayed to a user.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for identifying points of interest along a public transportation route, the method comprising:
   receiving a request to identify points of interest along a public transportation route, the request comprising a set of search parameters;
   querying a public transportation database for a plurality of public transportation stops along the public transportation route;
   identifying a set of nodes along the public transportation route, wherein each node in the set of nodes is a public transportation stop in the plurality of transportation stops;
   performing, using a processor, a search for points of interest based on the set of search parameters, each of the points of interest within a predetermined distance of a node in the set of nodes; and
   outputting the points of interest identified by the search.

2. The method of claim 1, wherein the set of search parameters includes at least one of a search term and a distance within which to search.

3. The method of claim 1, further comprising ranking the points of interest identified by the search.

4. The method of claim 3, wherein ranking each point of interest identified by the search is based on a distance from the point of interest to a node in the set of nodes.

5. The method of claim 3, wherein ranking each point of interest identified by the search is based on a distance from the point of interest to one of either a route starting point or a route ending point.

6. The method of claim 3, wherein ranking each point of interest identified by the search is based on whether a node in the set of nodes is a route transition point.

7. The method of claim 3, wherein ranking a point of interest within a predetermined distance of a node is based on a frequency of service for the node.

8. A system for identifying points of interest along a public transportation route, the system comprising:
   an interface module configured to receive a request to identify points of interest along a public transportation route, the request comprising a predetermined distance and a search term;
   a route module configured to:
      query a public transportation database for a plurality of public transportation stops along the public transportation route;
      identify a set of nodes along the public transportation route, wherein each node in the set of nodes is a public transportation stop in the plurality of transportation stops;
   a search module configured to perform, for each node in the set of nodes, a search for points of interest within the predetermined distance of the node based on the search term;

a rank module configured to prioritize the points of interest identified by the search; and wherein the interface module is further configured to output the prioritized points of interest.

9. The system of claim 8, where at least one node along the travel route is a route transition point.

10. The system of claim 8, wherein the rank module is configured to rank each point of interest identified by the search based on a distance from the point of interest to a node in the set of nodes.

11. The system of claim 8, wherein the rank module is configured to rank each point of interest identified by the search based on whether a node in the set of nodes is a route transition point.

12. The system of claim 8, wherein the rank module is configured to rank a point of interest within a predetermined distance of a node based a frequency of service for the node.

13. A machine-readable medium comprising instructions stored therein, which when executed by a machine, cause the machine to perform operations comprising:

receiving a request to identify points of interest along a public transportation route, the request comprising a set of search parameters;

querying a public transportation database for a plurality of public transportation stops along the public transportation route;

identifying a set of nodes along the public transportation route, wherein each node in the set of nodes is a public transportation stop in the plurality of transportation stops; and for each node in the set of nodes, identifying points of interest that conform to the set of search parameters and are within a predetermined distance of the node.

14. The machine-readable medium of claim 13, further comprising ranking the identified points of interest.

15. The machine-readable medium of claim 13, further comprising outputting the identified points of interest.

* * * * *